US00H002188H

(19) United States

(12) Statutory Invention Registration (10) Reg. No.: US H2188 H

Leithead et al. (43) Published: May 1, 2007

(54) TRANSMISSION SYSTEM

(75) Inventors: William Leithead, Renfrewshire (GB); Peter Jamieson, Glasgow (GB); Muthuvetpillai Jegatheeson, Auckland (NZ)

(73) Assignee: Gyro Energy Limited, Auckland (NZ)

(21) Appl. No.: 10/983,168

(22) Filed: Nov. 5, 2004

(51) Int. Cl.
*F16H 61/00* (2006.01)

(52) U.S. Cl. ..... 74/15.66

(58) Field of Classification Search ..... None
See application file for complete search history.

(56) References Cited

U.S. PATENT DOCUMENTS 6,972,498 B2 * 12/2005 Jamieson et al. ..... 290/55
2003/0230898 A1 * 12/2003 Jamieson et al. ..... 290/55

* cited by examiner

*Primary Examiner*—Dan Pihulic

(74) *Attorney, Agent, or Firm*—Dann, Dorfman, Herrell and Skillman, P.C.

(57) ABSTRACT

A number of methods and arrangements for controlling a gyroscopic continuously variable transmission (GVT) are described. The stroke length or effective stroke length of the input member (1) can be varied. A bearing arrangement includes a lubricant volume (212) and vanes (208) between an aperture and a shaft (8') to transmit power whilst allowing for movement between the components. A transmission system may have a number of GVT's and a cam member (304) to move the inputs of the GVT's. The transmission may be provided in a wind turbine.

4 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

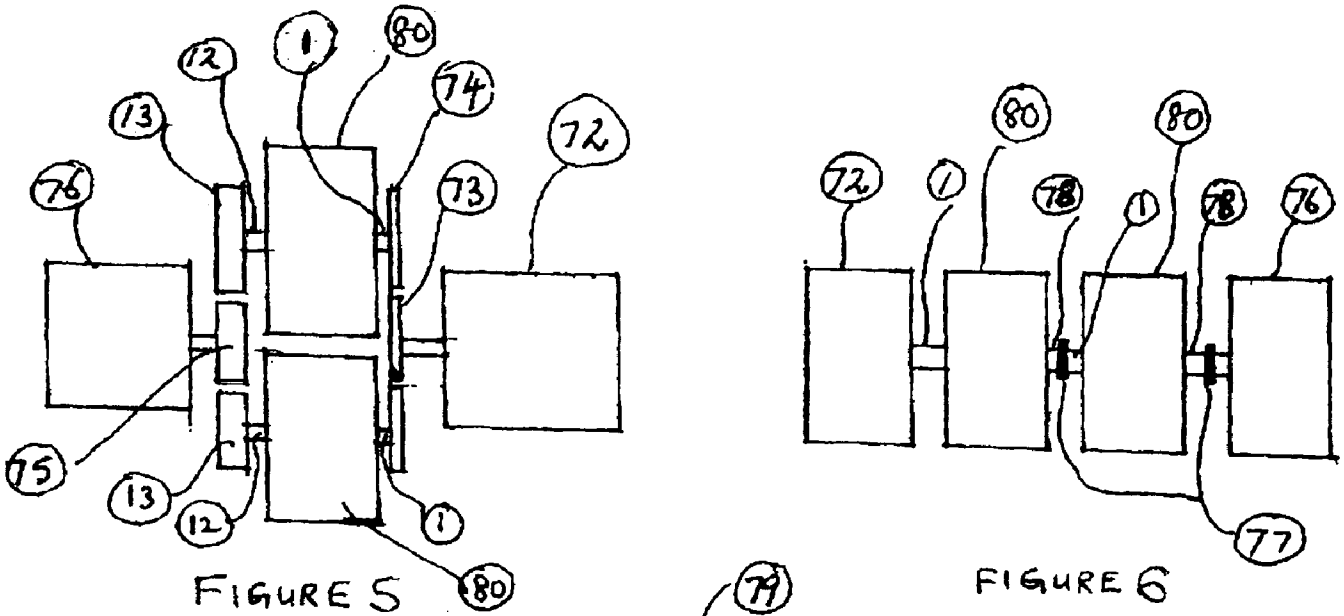
FIGURE 5
FIGURE 6
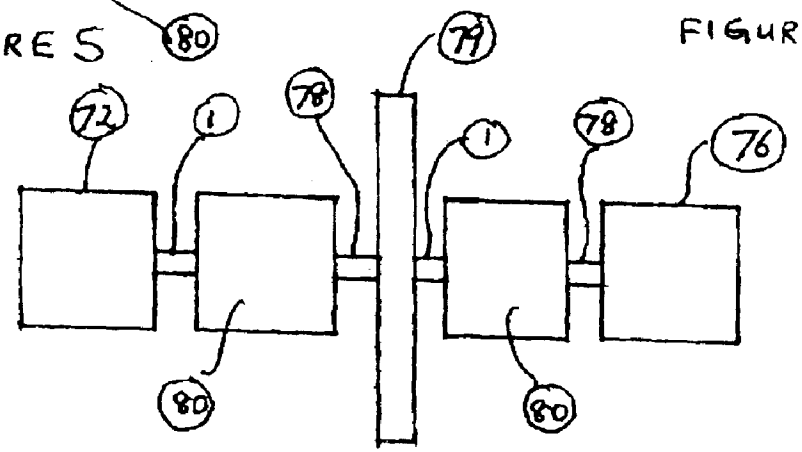
FIGURE 7

PRIOR ART

TRANSMISSION SYSTEM

FIELD OF INVENTION

This invention relates to transmission systems and has particular application to continuously variable transmissions. It is based on the ideas contained in our earlier International Application PCT/NZ99/00186, published as WO 00/45068 entitled Continuously Variable Transmission, and published in the name of Gyro Holdings Limited.

BACKGROUND OF THE INVENTION

The abstract of that PCT specification PCT/NZ99/00186 (published as WO 00/45068) described one example of a Continuously Variable Transmission. That abstract was based on various configurations including that shown in FIG. 10, and said: A transmission is provided which comprises a fixed housing or support 105, input means 121, 156 moveable relative to said support and a torque shaft 112 rotatable about its longitudinal axis and a driven shaft arranged to be rotated about its longitudinal axis by the torque shaft 112, a first one-way clutch 102 between the torque shaft 112 and driven shaft 104, linkage means 117, 134, 135, 132, 140, 147, 158, 170 rotatable about the axis of rotation of the driven shaft 104 under the influence of said input means 121 and an inertial body 113, 160 mounted on the linkage means to be cyclically angularly deflected in response to the input means, the reaction forces generated by the inertial body 113, 160 as it is cyclically deflected being applied to the torque shaft 112 as positive and negative torque and the torque shaft 112 being connected over a second one-way clutch 101 opposite to the first one-way clutch 102 either to said support 105 or to the driven shaft 104 over a rotation reversal system 150, 151, 152 whereby the drive shaft 155 can be rotated by the torque shaft 112 in one sense of rotation only. The inertial body preferably comprises a rotor 113 so that gyroscopic forces are applied to the torque shaft 112.

Various methods were described in said PCT application to generate and control the output torque. The methods described to spin the rotor varied from using an independent source to drive the rotor, to driving the rotor from the transmission input using gear trains and a one-way clutch.

The main method described to control the output torque involved controlling the independent source driving the rotor. Therefore when it is desired to maintain the input speed within narrow limits the only option left would be an independent source to drive the rotor to control the output torque by controlling the rotor speed.

The method of driving the rotor by an independent source such as an electric motor, while it is attractive poses challenges such as access to power supply, motor construction to withstand complex dynamic conditions and operating environment and therefore a subject for future development.

The method of driving the rotor by the input rotation through gear trains and one-way clutch, while it may be satisfactory for non-differential type configurations poses problems when used for differential type configurations as described in FIG. 10. This is due to the relatively high loadings on the rotor drive gear train caused by the accelerations and decelerations of the sub-frame that carry the rotor. The differential type configuration is preferred in many applications due to compactness, dynamic balancing etc.

OBJECT OF THE INVENTION

It is an object of this invention to provide improved transmission systems, or systems which will at least provide the public with a useful choice.

SUMMARY OF THE INVENTION

The subject matter of PCT/NZ99/00186 is incorporated herein by reference.

A transmission will be considered a gyroscopic continuously variable transmission ("GVT") if it comprises or includes: a fixed housing or support; an input member which is either rotatable about an axis of rotation relative to said fixed housing or support or reciprocable along an axis relative to said fixed housing or support; a torque shaft; and an output member arranged to be rotated about an axis of rotation by the torque shaft; a first one-way clutch between the torque shaft and output member; a linkage arrangement rotatable about the axis of the input member under the influence of said input member; and a gyroscopic rotor mounted on the linkage arrangement and having a spin axis which is cyclically angularly deflected in response to the input member to generate gyroscopic reaction forces, the reaction forces generated by the rotor as its axis is cyclically deflected being applied to the torque shaft as positive and negative torque; the first-one way clutch being configured to apply the positive torque to the output member; and the torque shaft being connected over a second one-way clutch opposite to the first one-way clutch either to said housing or support to apply the negative torque to the housing or support, or alternatively to the output member over a rotation reversal system to apply the negative torque to the output member as positive torque; with the arrangement of the first and second one-way clutches being such that the output member is rotated by the torque shaft in one sense of rotation only.

We have discovered a number of different ways of controlling the output torque of a continuously variable transmission. These control methods, and different transmission systems include using gyroscopic continuously variable transmission units ("GVT" units) such as described in PCT/NZ99/00186 in conjunction with differential gear units such as epicyclic units or coupling together two or more of the GVT units. In one example we illustrate split power transmission using at least one GVT unit. In another example we illustrate parallel coupling of two GVT's, in another example we illustrate a series coupling of two or more GVT's. We also describe varying the torque shaft inertia. We also illustrate differential type configurations of the GVT's.

In one aspect, the invention provides a transmission system containing at least one gyroscopic continuously variable transmission unit, and means for controlling the transmission output by controlling the input shaft, or the torque shaft, or by coupling together two or more gyroscopic continuously variable transmission units.

The transmission unit may preferably include a linear reciprocable input shaft, wherein the stroke length or effective stroke length of input shaft is adjustable to adjust the output characteristics of the transmission system.

In another aspect, the invention provides a wind turbine including a turbine rotor operatively connected to a shaft, a cam member having a camming surface and which is operatively connected to the shaft such that rotation of the rotor shaft rotates the cam member, and at least one gyroscopic continuously variable transmission unit having a housing fixed relative to a main wind turbine housing and having a reciprocable input member arranged to be reciprocated by the camming surface of the cam member upon rotation of the wind turbine rotor.

In another aspect, the invention provides a wind turbine including a turbine rotor operatively connected to a shaft, a cam member having a camming surface and which is fixed relative to a main wind turbine housing, and at least one gyroscopic variable transmission unit having a housing which is arranged to be rotated about a wind turbine rotor shaft axis as the wind turbine rotor rotates, the or each gyroscopic continuously variable transmission unit having a reciprocable input member arranged to be reciprocated by the camming surface of the cam member as the transmission unit(s) is/are moved by the wind turbine rotor.

Also described is a GVT having a rotor assembly mounted on the sub-frame and including a rotor with an axis substantially at right angles to the axis of the sub-frame and a one-way clutch to engage the rotor to a fixed member of the sub-frame whereby the speed of the main-frame is imparted to the rotor by the fixed member and the one-way clutch during one half of the rotation of the sub-frame about its axis and during the other half of the rotation the rotation of said fixed member is such that the rotor is allowed to free wheel by the one-way clutch.

Means may be provided whereby the speed of rotation of the rotor can be regulated and thereby control the output torque.

Alternatively varying the inertia of the torque shaft can control the output torque. This method is effective when the output speed is greater than zero and hence most useful in split power transmission using at least one GVT unit.

BRIEF DESCRIPTION OF THE DRAWINGS

Various embodiments of the present invention are described by way of example only, with reference to the accompanying drawings in which:

FIG. 5 illustrates a parallel coupling between two of the GVT units.

FIG. 6 illustrates a series coupling between two of the GVT units.

FIG. 7 illustrates storage and retrieval of mechanical energy using GVT units.

DETAILED DESCRIPTION OF PREFERRED EMBODIMENTS

Figure 9:
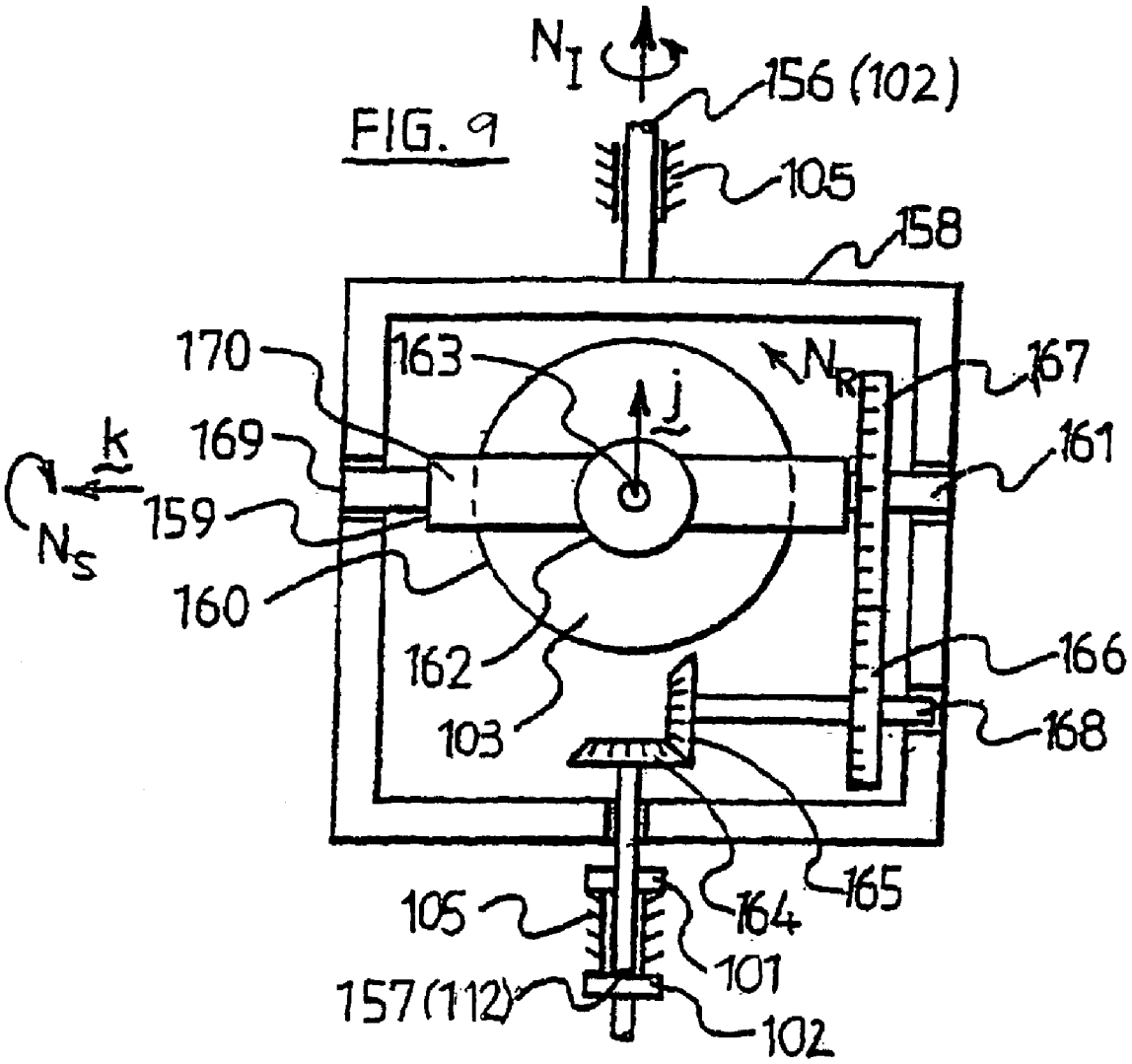
FIG. 9 (prior art) illustrates one configuration of the GVT of our earlier PCT/NZ99/00186 and is taken from FIG. 13 of that document.

Gyroscopic continuously variable transmissions are described in our International Patent Application PCT/NZ99/00186, and units such as that shown in FIG. 13 thereof (see FIG. 9 of this application) are examples of gyroscopic continuously variable transmission units (called "GVT" units).

EXAMPLE 1

Figure 1:
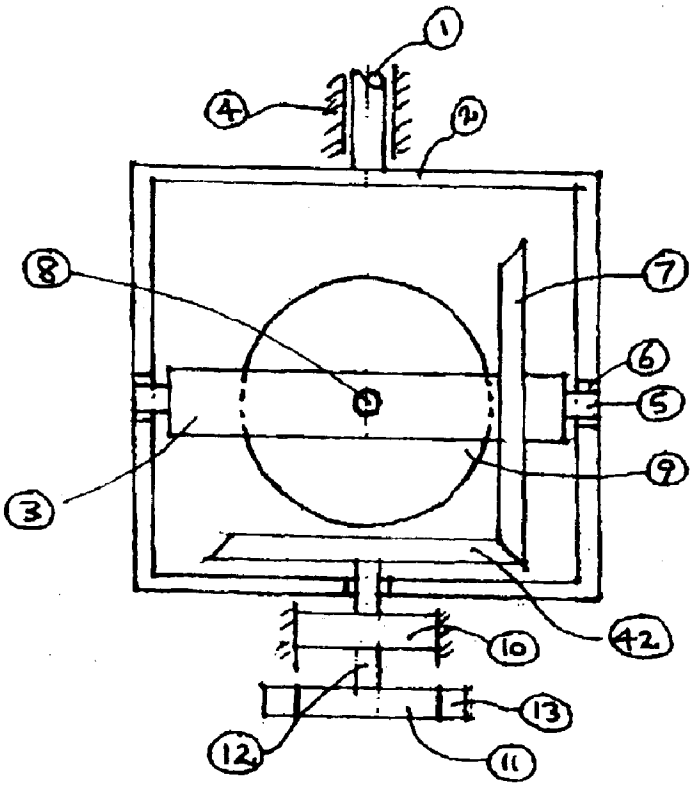
FIG. 1 illustrates the differential type configuration of the GVT.

FIG. 1 shows a differential type of configuration described therein. The transmission may have co-axial shafts 1 and 12. Shaft 1 is attached to the mainframe 2 while the other shaft is rotatable relative to said mainframe. A sub-frame 3 is rotatable relative to said mainframe with its axis substantially perpendicular to the axes of the co-axial shafts 1 and 12. A right-angled gear train 7, 42 is used to couple the sub-frame 3 to the shaft 12 so that the differential speed between the shaft 12 and the mainframe 2 is transferred to the sub-frame 3.

Shaft 1 is coupled to the input while the shaft 12 is fitted with a pair of opposed one-way clutches 10 and 11. Clutch 10 is operable to engage the shaft 12 to the transmission housing while the clutch 11 is operable to engage the shaft 12 to the output gear 13.

EXAMPLE 2

Figure 2:
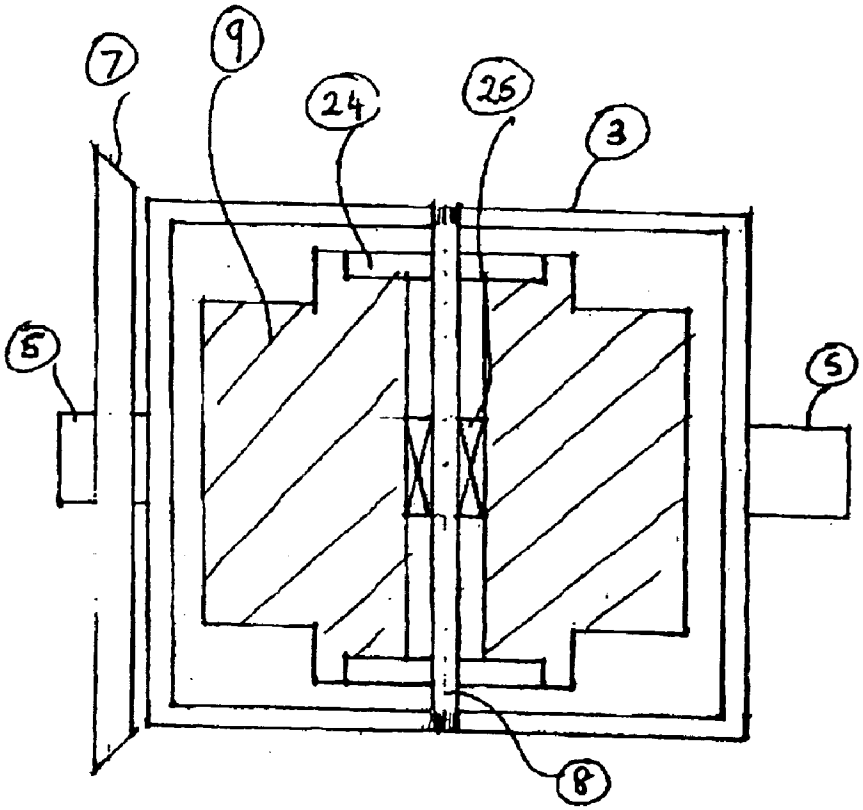
FIG. 2 shows the rotor driving means for a differential type configuration described by the present invention.

FIG. 2 shows an arrangement whereby the rotor 9 in FIG. 1 will be driven by the input rotation without the aid of a gear train.

The shaft 8 is concentric with the rotor 9 and locked to the sub-frame 3 by means such as splines at the ends. The rotor 9 is mounted on the shaft 8 on bearings 24. One-way clutch 25 engages the rotor to the shaft 8.

As the input shaft 1 rotates the differential rotation between the input shaft 1 and the torque shaft 12 is transferred to the shaft 5 by the gears 7 and 42. As the sub-frame 3 is attached to the shaft 5 it will also rotate and the orientation of the shaft 8 will change relative to the axis of the mainframe 2.

When the axis of the shaft 8 is parallel to the axis of the mainframe the speed of the shaft 8 about its axis reaches a maximum value equal to the input speed. The speed of the shaft 8 about its axis will thus vary sinusoidally as the sub-frame completes a full rotation about its axis, reaching maximum opposite values when the shaft 8 is parallel to the mainframe axis and zero value when the shaft 8 is at right angles to the axis of the mainframe.

The one-way clutch 25 will thus impart the input speed to the rotor 9.

It is possible to control the transmission output torque by varying the torque shaft inertia. This would be useful in split power transmission such as shown in FIG. 5 and described below. In order to control the output torque of the gyroscopic continuously variable transmission by varying the torque shaft inertia, sufficient speed should be available on the output shaft of the transmission. This is not always available unless the gyroscopic continuously variable transmission is used in suitable configurations. Such examples are described below.

EXAMPLE 3

Figure 4:
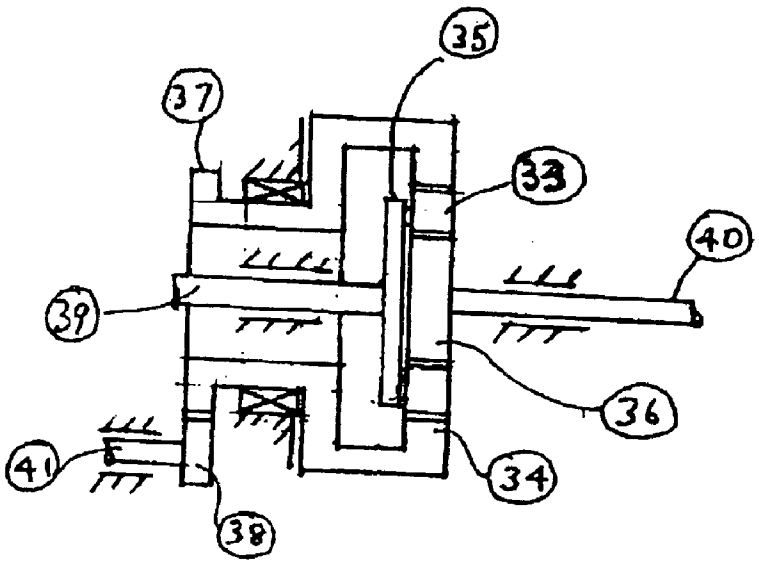
FIG. 4 shows an epicyclic differential gear unit with provision for split power transmission.

An epicyclic gear unit is shown in FIG. 4 where the sun gear 36, the planet carrier 35 and the annulus 34 are all rotatable as in split power transmission. If one of these members is coupled to the output of the gyroscopic continuously variable transmission then it is possible to have the output of the gyroscopic transmission in rotation while the final output may still be at rest. For instance the sun gear may be connected to the GVT output, and the ring gear and the planet carrier to the input and the load respectively or vice versa and the GVT input may be connected to the input of the transmission if desired. Such an arrangement is an example only, and would be suitable for transport applications.

In another instance the sun gear may be connected to the load and the ring gear and the planet carrier to the input and the GVT output respectively or vice versa and the GVT input may be connected to the load if desired. Such arrangement is an example only and is suitable for power generation applications.

Declutching

By combining the epicyclic gear unit of FIG. 4 with a GVT system in which the inertia of the torque shaft is adjustable, declutching can occur, which is when there is zero output torque at the overall output of the system even when there is input movement.

By having adjustable inertia of the torque shaft, the amount of torque applied to the output shaft can be varied.

This type of declutching is useful when declutching cannot be achieved by reducing the rotor speed to zero—for example when minimal response time is available or the rotor is being driven by the input motion.

Declutching can be achieved in a linearly reciprocating input GVT by selectively freeing the input movement from the linkage arrangement. This could be achieved for example by providing a hydraulic ram as a member of the linkage arrangement with a by-pass valve. By opening the by-pass valve of the hydraulic cylinder, the piston will be free to move relative to the cylinder so that no input movement occurs at the GVT and hence no torque is transferred to the transmission output. When the valve is closed, power will be transmitted through the system.

In general, the GVT units can be modified in different ways, and can be combined to allow for greater control over the output. Some of these combinations will be described below. For example a parallel coupling is shown in FIG. 5. A series coupling is shown in FIG. 6. The GVT can also be used as a variator for split power transmission with particular advantage as described with reference to FIG. 4. Another useful application of the GVT is for efficient storage and retrieval of mechanical energy.

The series coupling provides an example using the torque shaft inertia to control the transmission and is provided by using the gyroscopic continuously variable transmissions in series—this is described and illustrated below in example 7. In this case, the input is coupled to the input of the first gyroscopic continuously variable transmission and the output of the first gyroscopic continuously variable transmission is coupled to the input of a second gyroscopic continuously variable transmission. The output from the second gyroscopic continuously variable transmission is coupled to the final output. The torque shaft inertia variation will be provided to the first gyroscopic continuously variable transmission. This example is particularly advantageous for transport applications.

In operation, even when the final output speed is. zero the output speed of first unit can be greater than zero with zero output torque. By varying the torque shaft inertia the output speed of the first unit will be varied and hence the input speed to the second unit.

EXAMPLE 4

Figure 3:
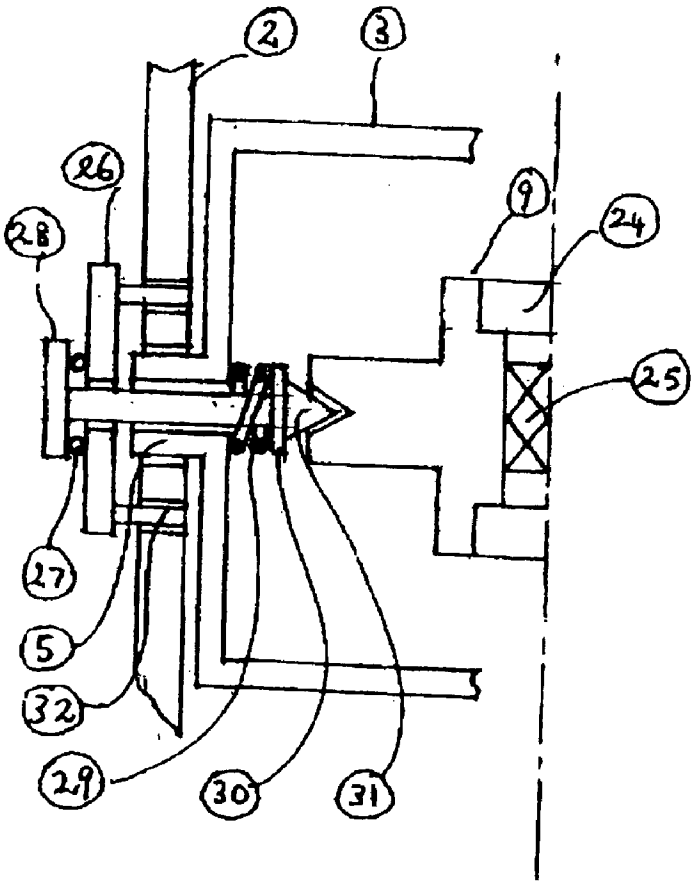
FIG. 3 shows a means of controlling the rotor speed. In this arrangement a spring-loaded brake is shown with centrifugal release.

FIG. 3 shows an example of arrangement whereby braking action may control the speed of the rotor and thereby the gyroscopic continuously variable transmission.

The brake shoe 31 is pressed against the rotor 9 by springs 29. A centrifugal weight 26 may be used as an example to release the brake. In the arrangement shown a thrust bearing 27 is provided between the centrifugal weight and the stem of the brake 28 and the centrifugal weight is prevented from rotating about the sub-frame axis by the pins 32 between the centrifugal weight 26 and the mainframe 2.

If the sub-frame inertia is so designed that with the rotor 9 locked by the brake the output torque is zero, then the above-described arrangement provides a means of predetermining the input speed below which the output torque is zero i.e. equivalent to de-clutch or neutral gear in convention gear systems.

EXAMPLE 5

Parallel Coupling

This is shown in FIG. 5. 72 is the input source such as a motor. 80 are GVT units and 76 is the load. 73, 74, 13 and 75 are gears for the parallel coupling. Several GVT units can be coupled in parallel with no adverse effects. Conventional CVTs transmit torque and therefore when coupled in parallel require exactly identical speed ratios if they are to share the power transmission. This condition does not apply to GVT as it does not transmit torque but rather generates torque, based on speeds of the various components.

The advantages of parallel coupling are:

(a) Several units can be used to transmit power from one or more inputs to one or more outputs.

(b) Because of (a) there is practically no limitation to the overall transmission capacity.

EXAMPLE 6

Series Coupling

An example of this is shown in FIG. 6. Other than as mentioned here, the numbering is the same as in FIG. 5. 78 are the GVT output shafts and 77 are couplings. As described previously, series coupling provides the opportunity to control the transmission by varying the inertia of the torque shaft of the first unit. In general the advantage of the series coupling is to provide a variable input speed to the second unit to which the final output is coupled from the output of the first unit to which the transmission input is coupled while the transmission input speed can remain constant.

EXAMPLE 7

Split Power Transmission

This is described in Example 3, with reference to FIG. 4, above. The GVT can either input power into the differential unit such as the epicyclic or draw power out of the differential unit.

One key advantage of the split power arrangement will be to provide a versatile variable transmission such as the GVT itself but the GVT capacity required can be much less than the overall transmission. For example in wind power application a constant speed generator, variable speed turbine and GVT output can be coupled to the epicyclic and since the turbine torque should vary as a function of the square of the turbine speed for maximum turbine efficiency, the theoretical power capacity required by the GVT is only 14.8% of the turbine capacity.

EXAMPLE 8

Storage and Retrieval of Mechanical Energy

This is schematically shown in FIG. 7. Other than as mentioned here, the numbering is the same as in FIG. 5. 79 is a flywheel.

One of the unique features of GVT transmissions is their large range of speed ratios. This can be exploited to store and retrieve energy using a flywheel. In order achieve this, a first unit will be coupled to the variable input source and the flywheel and the input torque will be varied to maintain optimum input conditions. The second unit will be used to draw energy from the flywheel to the output and the input torque of the second unit can be varied to match the output requirement.

EXAMPLE 9

Figure 8:
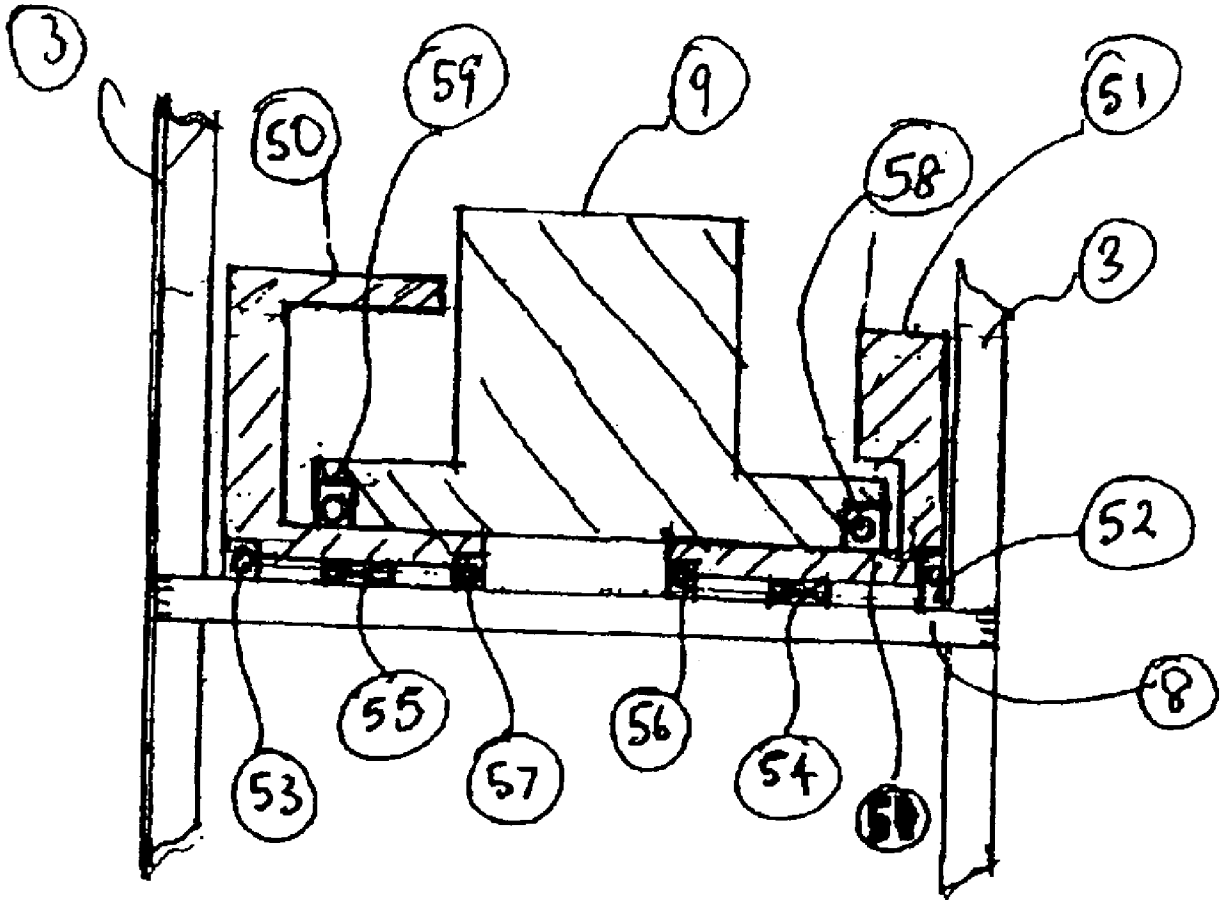
FIG. 8 illustrates an alternative method of rotor drive to that described in FIG. 2.

FIG. 8 illustrates a very useful modification to the rotor drive and control described with reference to FIGS. 1 and 2 above. This is very useful when the input speed is relatively high and constant. This arrangement will avoid very high one-way clutch loadings if the engine speed remains constant at high value but the rotor speed has to vary from zero to maximum.

3 is the sub-frame and shaft 8 is fixed to the sub-frame 3 as before. 9 is the rotor.

In this arrangement the member 50 is mounted on the shaft 8 with bearings 53 and 57 and a one-way clutch 55 couples the shaft 8 to the member 50.

The member 51 is provided if necessary to balance the gyroscopic and other dynamic forces on the member 50 by providing a one-way clutch 54 in opposite sense to that of 55. The member 51 may be mounted on the shaft 8 by the bearings 52 and 56. The member 50 is provided with means to gradually couple the rotor 9 to itself by such as eddy current braking.

In this example the rotor is mounted on the members 50 and 51 by the bearings 58 and 59.

In operation, the input speed is raised and maintained at a fixed speed and the members 50 and 51 gain spin speed relative to the shaft 8 but in opposite directions while the rotor does not gain spin speed. However when the coupling means is energised the rotor gradually becomes coupled to the member 50 causing net output torque.

Stroke Length Variation

The output characteristics of a GVT can be varied by varying the stroke length of the input member/shaft, or at least the effective stroke length. This could be achieved for example by varying the geometry of the linkage arrangement which operatively connects the input member/shaft to the rotor arrangement. The linkage arrangement geometry can be easily varied during the reaction stroke when forces in the linkage arrangement are small.

Rotor Bearing Arrangement

Figure 10:
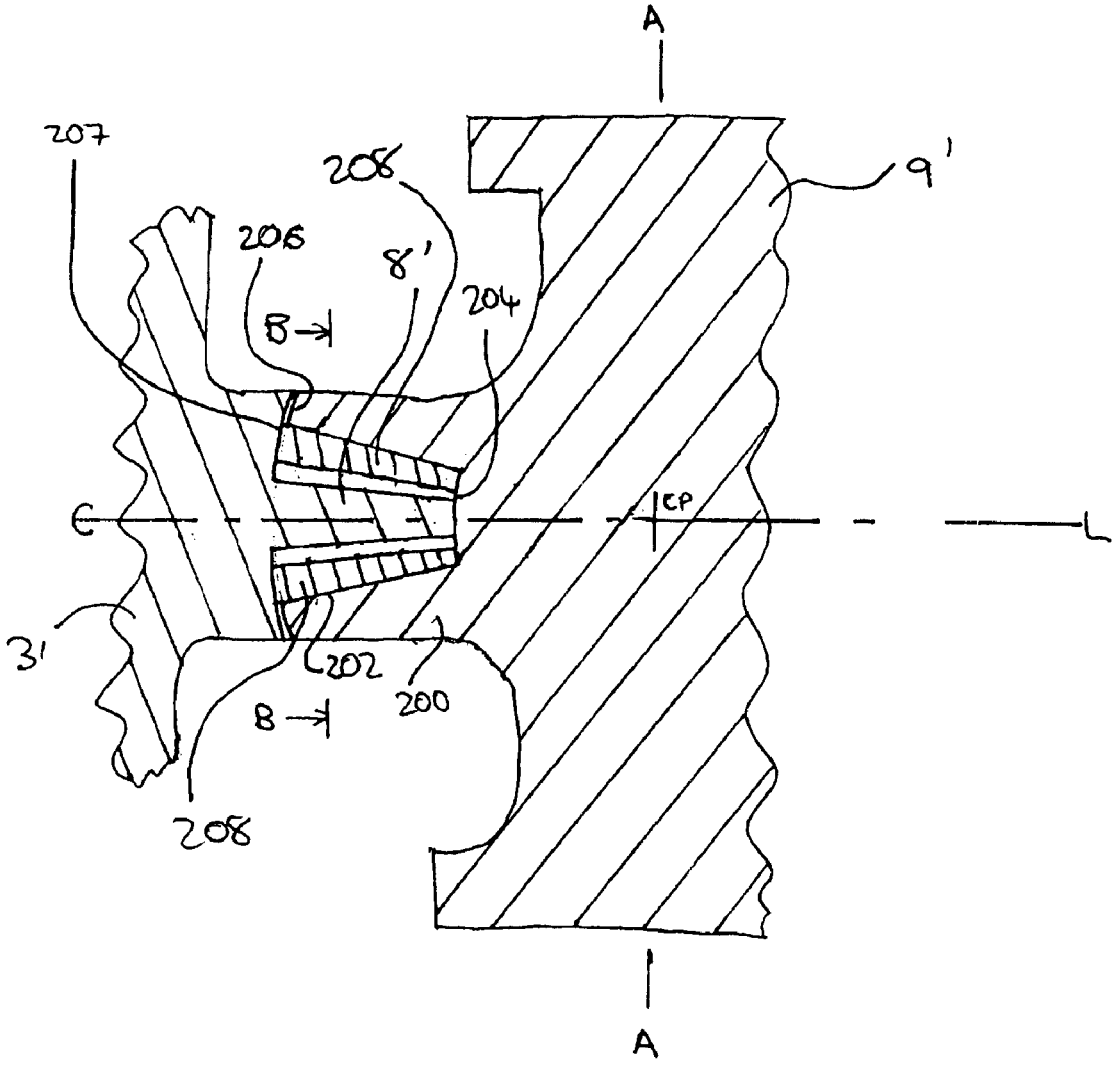
FIG. 10 illustrates a bearing arrangement for supporting the rotor on the sub-frame.
Figure 11:
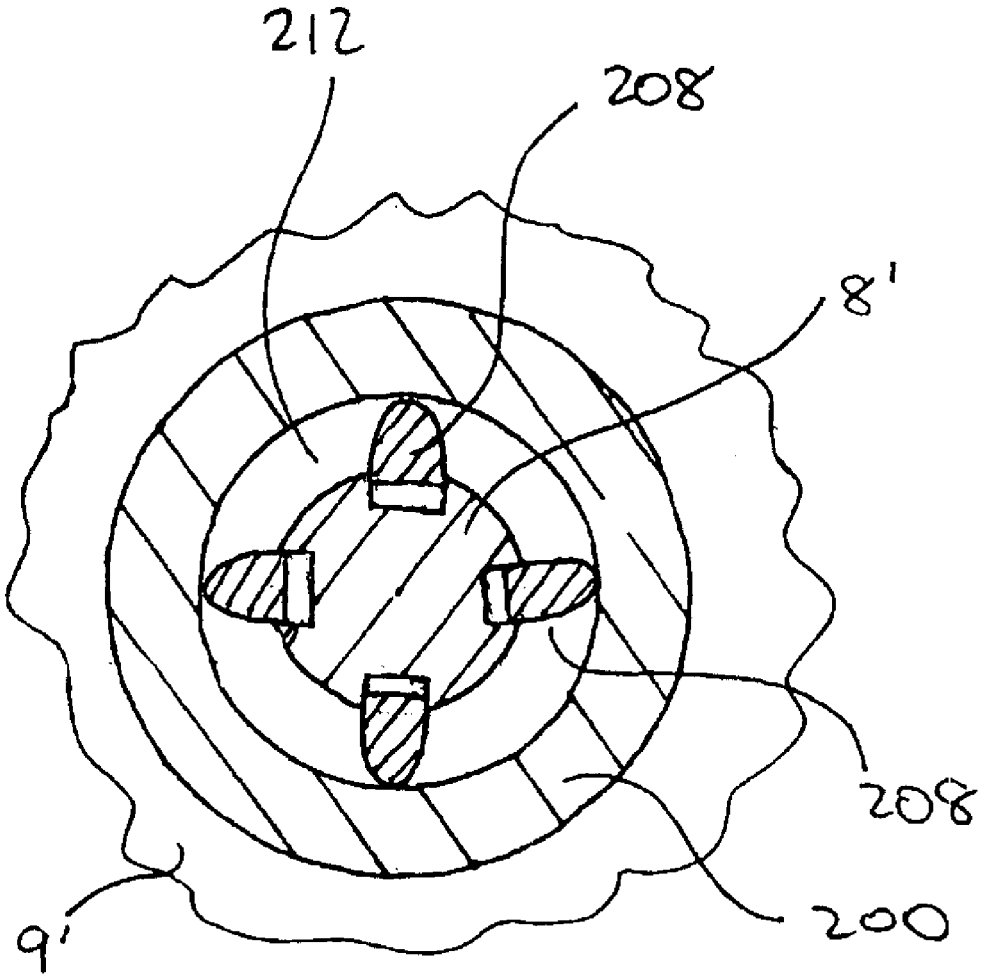
FIG. 11 illustrates a cross-sectional view along line A—A of FIG. 10.

FIGS. 10 and 11 show a preferred bearing arrangement for supporting the rotor 9' on the sub-frame 3'. The rotor includes a boss part 200 having a tapered blind aperture 202. The rotor will also be provided with a further boss part (not shown) on the opposite side of the rotor, which also has a blind aperture. For the sake of explanation, the rotor can be considered to be symmetrical about line A—A, although that would not be essential. The stubs 8' (only one of which is shown) extend from the sub-frame 3' and are positioned in the blind apertures of the boss parts. Each stub 8' and aperture 202 forms a conical frustum of annular cavity 212 with convex and concave ends formed between the tapered blind apertures 202 and the tapered surfaces of the stubs 8'.

Figure 12:
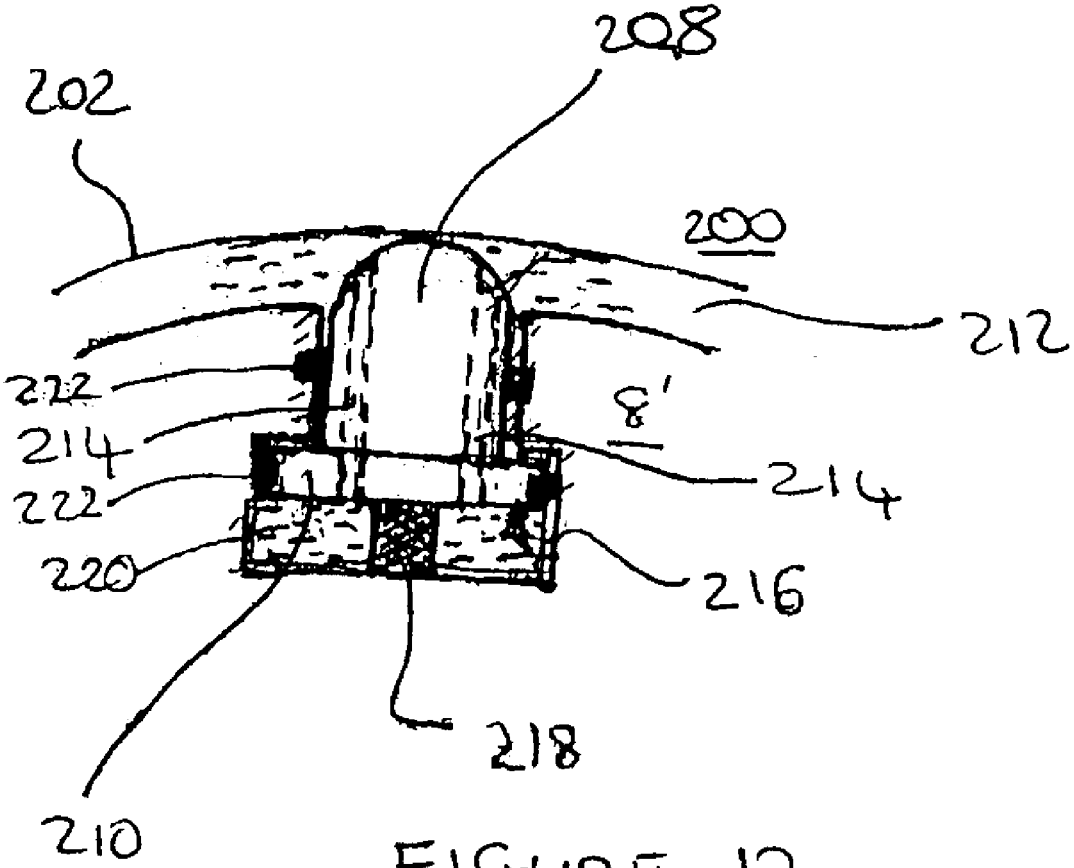
FIG. 12 is a close up view of a single vane of the bearing arrangement of FIG. 10, showing useful features.

The annular cavity 212 is divided into linear chambers around the centre line CL of the boss/stub by vanes 208. The vanes are either positioned in slots in the stubs 8' as shown, or alternatively in slots in the apertures 202 of the boss parts 200. The vanes can slide radially in the slots. While four vanes 208 are shown in FIG. 12, a greater or lesser number of vanes could be provided as required. A greater number of vanes will reduce the net side thrust from oil pressure on the vanes during operation.

The ends of the stubs 8' and vanes 208, the sub-frame surfaces 207, and the shoulders 1206 of the bosses 200 and the surfaces at the bases of the apertures 202 are all substantially spherical, with centres coincident with the intersection CP of the sub-frame axis and the main frame axis. These surfaces seal the annular cavity 212. The chambers of the cavity are filled with lubricating fluid. Each oil chamber between the adjacent vanes is in communication with a low pressure lubrication source such as a pump, via independent non-return valves.

The vane need not have the broader base 210 and therefore can also appear as in FIG. 11.

Using this arrangement, viscous shear losses can be minimised by providing a relatively large lubricant space, and at the same time flow losses can be minimised through direct contact between the spherical surfaces of the vanes, stubs, sub-frame, and aperture in the rotor. When a greater number of vanes are used, side thrust on each vane due to pressure differences between either side of the vane is reduced. The arrangement shown allows some radial movement between the sub-frame/stub shaft and the rotor while developing the bearing support pressure when the rotor is loaded with fluctuating gyroscopic reaction torque. This bearing arrangement is feasible only because the gyroscopic loading is changing in direction all the time.

FIG. 12 and FIG. 13 show details of the arrangement of the vanes 208 in cross sections. Each vane is slidably mounted in an aperture 216 in the stub shaft 8', and a biasing device such as a spring pad 218 biases the vane radially outwardly relative to the stub shaft. The spring pad is fixed to the stub or the vane so as to inhibit sideways movement and also to act as a partition between the fluid on the left and the right side of the vane. By providing holes 214, the fluid pressure at the top and the bottom of the vane is equalised. Seals 222 may be provided between the walls of the aperture 216 and the vane if required. Alternatively, a flow path may be provided around the outside of the vanes, so that fluid can flow between each vane and the wall of the respective aperture 216, to equalize the pressure at the top and bottom of the vanes. The flow path could be provided by apertures in the stubs 8', rather than in the vanes.

In operation, oil pressure is developed in the corresponding chambers of the annular cavity 212 when reaction torque is applied on the rotor 9' as the rotor tries to rotate relative to the stubs 8' about the centre CP under the influence of the torque. In general the pressure developed is not equal on either side of the vane. Further the pressure developed will push the vane into the slot unless the pressure force is balanced from the base of the vane. This is achieved by pressure balancing holes 214 and a seal 218 at the base as shown in FIG. 12. This seal should also provide some spring action to keep the base of the vane away from the base of the slot and provide some lateral stiffness to itself against the force due to unequal pressure on either side of the vane. Seals 222 on the sides of the vanes are not critical.

The rotor will attempt to rotate in all directions about its centre point CP. When, for example, the rotor attempts to turn anticlockwise about CP, due to the incompressibility of the lubricating fluid, pressure will develop in the upper chambers 212 of the left hand bearing and the lower chambers of the right hand bearing to resist torque, and a low pressure region will be formed in the lower chambers of the left hand bearing and the upper chambers of the right hand bearing. At that time, lubricant can be delivered into the low pressure chambers from the pump via non-return valves. Similarly, when the rotor attempts to turn clockwise, lubricant can be delivered into the upper chambers of the left hand bearing and lower chambers of the right hand bearing, which will be at low pressure.

If desired, a roller or rod could be provided in a groove or aperture in the end of each vane 208 which contacts the wall 202 of the boss 200. The grooves or apertures will be capable of retaining the rollers, say by having a cross section greater than 180 degrees. The rollers will not be subjected to loading as the oil pressure will take care of the loadings.

Minimising Radial Loads for the use of Hydraulic Thrust Bearings

Figure 13A:
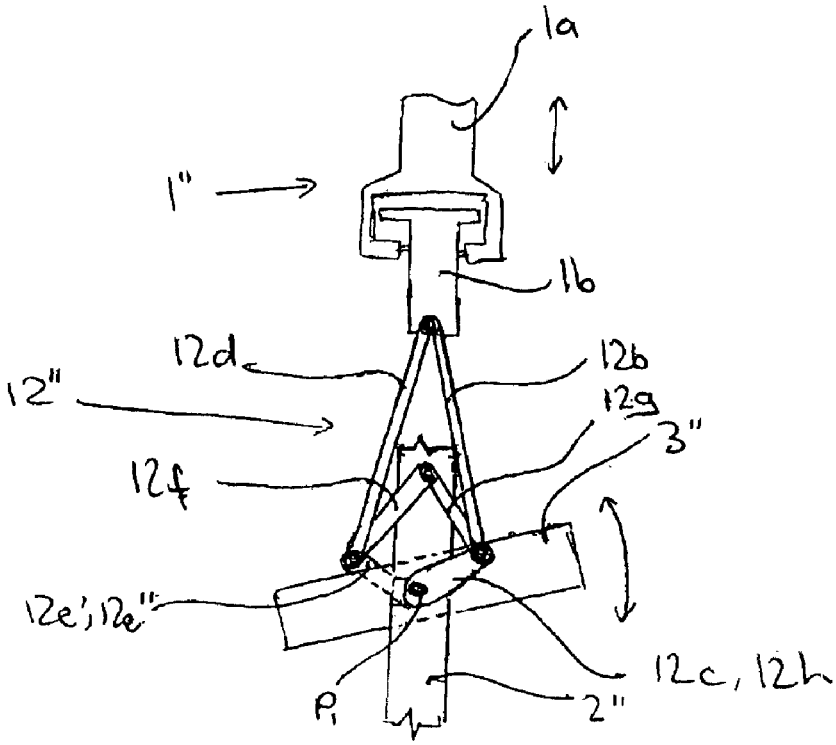
FIG. 13*a* is a schematic part section side view of an arrangement to minimise radial loads on thrust bearings.
Figure 13B:
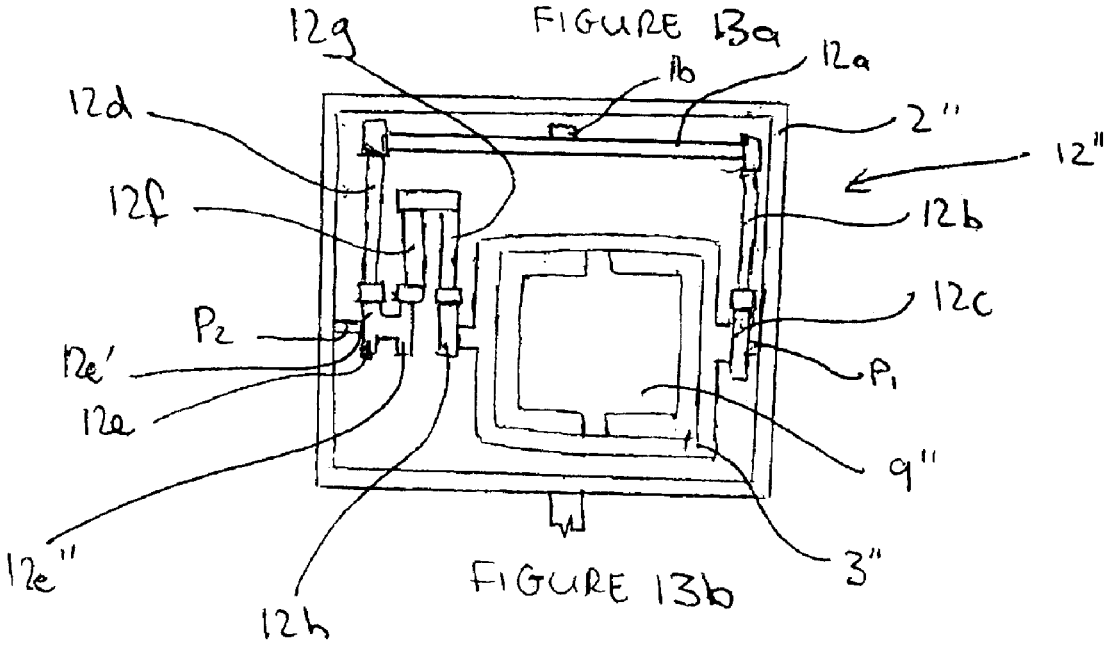
FIG. 13*b* is a schematic front view of the arrangement of FIG. 13*a*.

FIGS. 13*a* and 13*b* show a GVT having an alternative linkage arrangement for eliminating or minimising radial loads on thrust bearings. In this embodiment, a reciprocating input member 1" includes an input shaft 1*a* having an internal chamber in its base, and a piston 1*b* movably received in the chamber to define a double thrust bearing. Alternatively, the chamber could be formed in component 1*b* with the shaft 1*a* being formed as a piston. The chamber will contain a fluid such as lubricating oil, and will be sealed by a seal around the piston shaft. As the input shaft 1*a* moves downwards, a high pressure region develops above the piston, and when the shaft 1*a* moves upwards a high pressure region develops below the piston. This arrangement enhances the rotational movement of the piston within the chamber, which is required for operation of the GVT. The upper and lower parts of the chamber may be in fluid communication with a pump via non-return valves, so fluid can be transferred to the low pressure side.

However, with such a thrust bearing it is important to minimise side loadings. In the embodiment shown, a linkage arrangement is provided to reduce the side loadings. As can be seen, the GVT includes a main frame 2", a rotor 9" carried by a sub-frame 3", and a linkage arrangement indicated generally by reference number 12" which connects the sub-frame and input. The input shaft 1*b* is connected to a cross member 12*a*. At one end, the cross member is pivotally connected to a link 12*b*, which at its opposite end is pivotally connected to a crank 12*c*. The crank 12*c* is rigidly attached to the sub-frame 3" which is rotatably mounted on a bearing on a shaft $P_1$ which is fixed to the main frame. At the other end, the cross member 12*a* is pivotally connected to a link 12*d*, which at its opposite end is pivotally connected to a double crank 12*e* which has two crank parts 12*e*', 12*e*" which have opposite orientations to crank 12*c*. The crank 12*e* is not attached to the sub-frame 3" but is rotatably mounted in a similar manner to the sub-frame 3" on a bearing on a shaft $P_2$ which is collinear to shaft $P_1$ which is fixed to the main frame. The crank part 12*e*" is pivotally connected to a link 12*f*, which is pivotally connected to a link 12*g*. The other end of the link 12*g* is pivotally connected to a crank 12*h* which is rigidly attached to the subframe 3". Crank 12*h* has the same orientation as crank 12*c*.

In operation the force from the reciprocating member 1*b* is applied to the sub-frame cranks 12*c*/12*h* in the same direction and via the links 12*d*/12*b*. The transverse components of forces in 12*d*/12*b* are cancelled allowing 1" to operate as a ram without transverse forces and at the same time allowing the shaft 1*b* to rotate relative to shaft 1*a*.

Hollow Bearings

In the GVT, it is desirable that radial and thrust bearings should have good resistance against Brinelling or contact wear, as well as a high load rating. U.S. Pat. No. 5,071,265 and U.S. Pat. No. 5,033,877 describe thrust and radial bearings respectively in which the rollers are hollow. Such bearings are marketed by Kaydon Corporation of Muskegon, Mich., USA, under the HOLO-ROL trade mark. Those bearings have the advantage of reducing centrifugal loading from the rollers, and are shock absorbent due to being relatively flexible. They also generally have good radial stiffness. However, the bearings described in those documents have relatively low load rating. It is believed that by reducing the size of the apertures in the rollers relative to the outer diameter of the rollers, that will maintain the roller strength and load capacity and life of the bearings whilst still reducing contact stress (although by a lesser amount).

INDUSTRIAL APPLICATION

The transmission systems of this specification can be used in a number of different ways. Some of the examples are particularly suited to continuously variable transmissions for automotive use. Some of the systems described are particularly suited to the storage of energy, where the input shaft is subjected to fluctuating loads, for example windmill or wind turbine devices.

Figure 14:
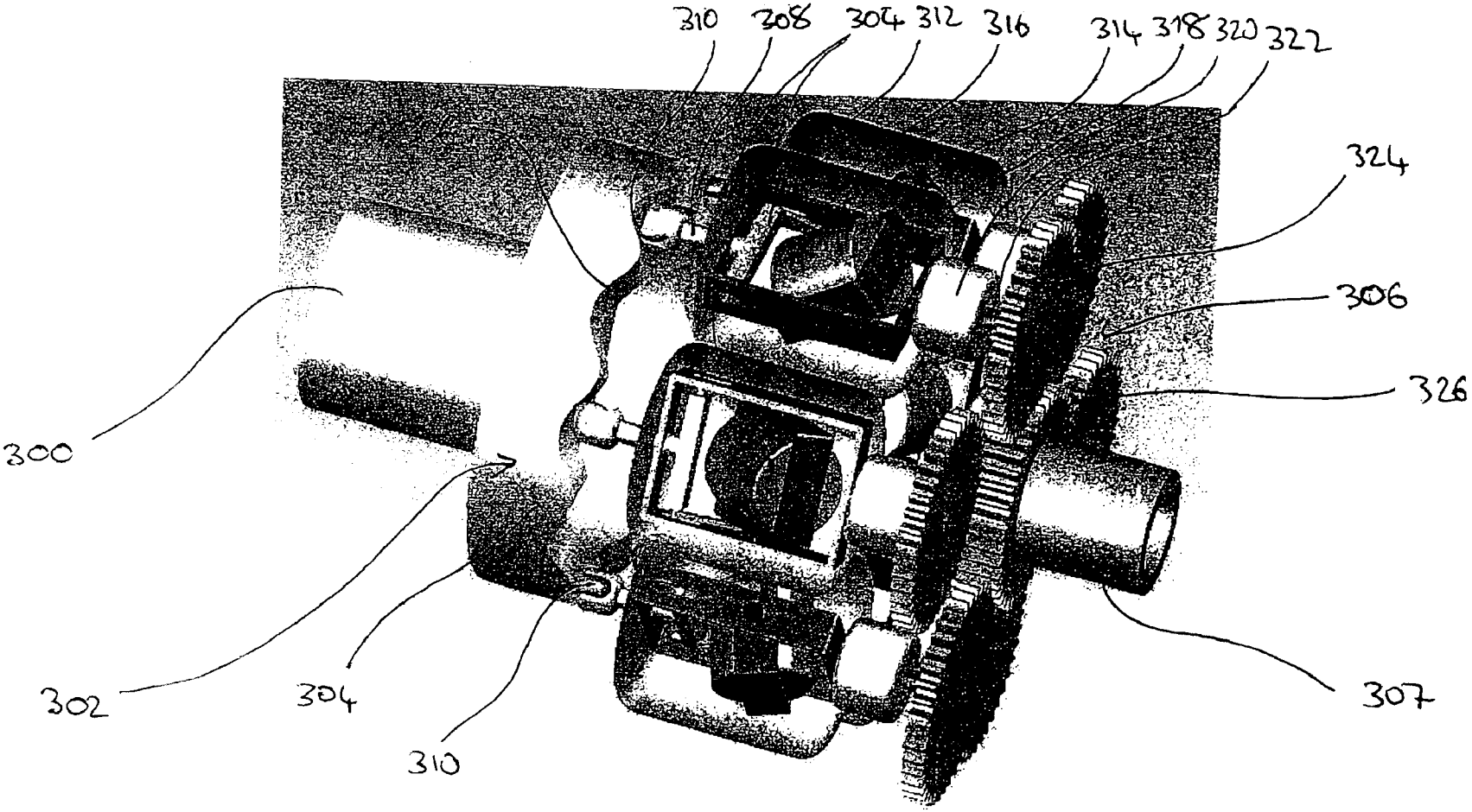
FIG. 14 is a three dimensional view of a transmission utilising GVT units in parallel.

FIG. 14 shows a transmission using a number of reciprocable input GVT units in parallel. The embodiment shown is particularly useful for use in a wind turbine, but has other applications such as wave power or automotive. The wind turbine has a shaft 300 which will generally be rotatably driven by the wind turbine rotor (not shown). The rotor shaft 300 is operatively connected to a cam arrangement 302, which transfers motion to the input members of a plurality of reciprocating input GVT units 304. The outputs of the GVT units drive a gear arrangement 306, which in turn drives an output member 307.

The cam arrangement 302 has an annular cam member 304 having a camming surface 306. The camming surface is configured to provide reciprocal motion of the input members 308 of the GVT units 304. A roller arrangement 310 is provided at the end of each GVT input member 308, and runs along the camming surface 306 as the cam member 304 is rotated by the wind turbine shaft 300. The reciprocating motion of the GVT input members 308 causes movement of a linkage member 312, which in turn moves an inner frame member 314 which carries a gyroscopic rotor 316. Precession of the rotor results in rotation of an outer frame member 318 about an axis parallel to the input member 308. Positive and negative torque from the outer frame member 318 are rectified by a pair of one way clutches inside a clutch housing 320, and the positive torque is transmitted to an output member 324 of each GVT. The output of each GVT is operatively connected to a respective gear 324, and the gears 324 are meshed with a main output gear 326 which transmits torque to the turbine output member 307.

In operation, as the wind turbine rotor rotates, the shaft 300 rotates, which results in rotation of the cam member 304. The portions of the camming surface 306 closest to the GVT units drive the GVT inputs 308 inwards, which result in precession of the axes of the GVT rotors. Positive and negative torque are rectified by the GVT arrangements, and positive torque is delivered to the gear members 324 and ultimately to the main output 307. A further camming surface or spring arrangement may be provided to drive the GVT inputs 308 outwards following their inward movements.

The high possible speed ratio of a reciprocating input GVT results in a high wind turbine output member 307 speed for a low wind turbine rotor shaft 300 speed.

In the illustrated embodiment, the housing of each GVT unit is fixed relative to a wind turbine housing (not shown), and the cam member rotates relative to the wind turbine housing. In an alternative embodiment, the cam member could be fixed relative to the wind turbine housing, and the rotor shaft 300 could be configured to rotate the GVT units about the rotor shaft 300 axis to reciprocate their inputs. This is again suitable for wind turbines because of the relatively low turbine speeds. In this embodiment, reaction forces in the GVT units will drive their inputs outwardly following the inward movement from the camming surfaces. The rotation of the GVT units can be controlled to control the reaction force applied to the GVT input members, which drive them outwardly following the inward movement. A separate drive could be used to move, or alter the movement of, the GVT's relative to the camming surface.

That feature also has application for other GVT's, and the GVT housings could be rotated to control the reaction force which drives the GVT input outwardly. If the main GVT frame (such as 2" in FIG. 13*b*) is not moving, by rotating the GVT housing that will rotate the main frame, to provide the returning force for the GVT input member.

In the embodiment shown, regulation of output power could be achieved by sliding the cam and/or GVT units in an axial direction.

The turbine shaft can be locked by locking one or more the input linkages for maintenance and other purposes.

Other types of cams could be used to provide the reciprocating motion of the GVT inputs, for example axial (as shown), radial or oblique cams could be used. The wind turbine could use a single GVT unit if desired.

Many variations of the transmission systems described above are possible, and all such combinations of the GVT units, or other control systems described above, are possible, and are deemed to be covered herein whether or not such combinations are explicitly described, as for example the series of parallel coupling of different units.

Finally, various other alterations and modifications may be made to the foregoing without departing from the spirit or scope of this invention.

The invention claimed is:

1. A transmission system containing at least one gyroscopic continuously variable transmission unit, and means for controlling the transmission output by controlling the input shaft, or the torque shaft, or by coupling together two or more gyroscopic continuously variable transmission units.

2. A transmission system as claimed in claim 1 including a linear reciprocable input shaft, wherein the stroke length or effective stroke length of input shaft is adjustable to adjust the output characteristics of the transmission system.

3. A wind turbine including a turbine rotor operatively connected to a shaft, a cam member having a camming surface and which is operatively connected to the shaft such that rotation of the shaft rotates the cam member, and at least one gyroscopic continuously variable transmission unit having a housing fixed relative to a main wind turbine housing and having a reciprocable input member arranged to be reciprocated by the camming surface of the cam member upon rotation of the wind turbine rotor.

4. A wind turbine including a turbine rotor operatively connected to a shaft, a cam member having a camming surface and which is fixed relative to a main wind turbine housing, and at least one gyroscopic continuously variable transmission unit having a housing which is arranged to be rotated about a wind turbine rotor shaft axis as the wind turbine rotor rotates, the or each gyroscopic continuously variable transmission unit having a reciprocable input member arranged to be reciprocated by the camming surface of the cam member as the transmission unit(s) is/are moved by the wind turbine rotor.

* * * * *